March 14, 1939.    F. J. MOLES    2,150,776
TRAFFIC ANALYZER
Filed March 14, 1935    3 Sheets-Sheet 1

Inventor:
Frank J. Moles,
by Harry E. Dunham
His Attorney.

March 14, 1939.    F. J. MOLES    2,150,776
TRAFFIC ANALYZER
Filed March 14, 1935    3 Sheets-Sheet 2

Inventor:
Frank J. Moles,
by   Harry E. Dunham
His Attorney.

March 14, 1939.  F. J. MOLES  2,150,776
TRAFFIC ANALYZER
Filed March 14, 1935  3 Sheets-Sheet 3

Inventor:
Frank J. Moles,
by Harry E. Dunham
His Attorney.

Patented Mar. 14, 1939

2,150,776

UNITED STATES PATENT OFFICE 2,150,776

TRAFFIC ANALYZER

Frank J. Moles, Ferndale, Mich., assignor to General Electric Company, a corporation of New York Application March 14, 1935, Serial No. 11,086

10 Claims. (Cl. 235—92)

My invention relates to speed indicating, counting, and analyzing methods and devices and concerns particularly arrangements for analyzing or classifying vehicular traffic.

The primary object of my invention is to provide simple and rugged apparatus which may be constructed and operated easily and with relatively little cost for producing both an indication of the speed of a vehicle passing a given point on the road and a record of the vehicles which have passed, classified according to their speeds.

Another object is to provide warnings in case of vehicles passing at excessive speeds.

Other and further objects and advantages will become apparent as the description proceeds.

Figure 1:
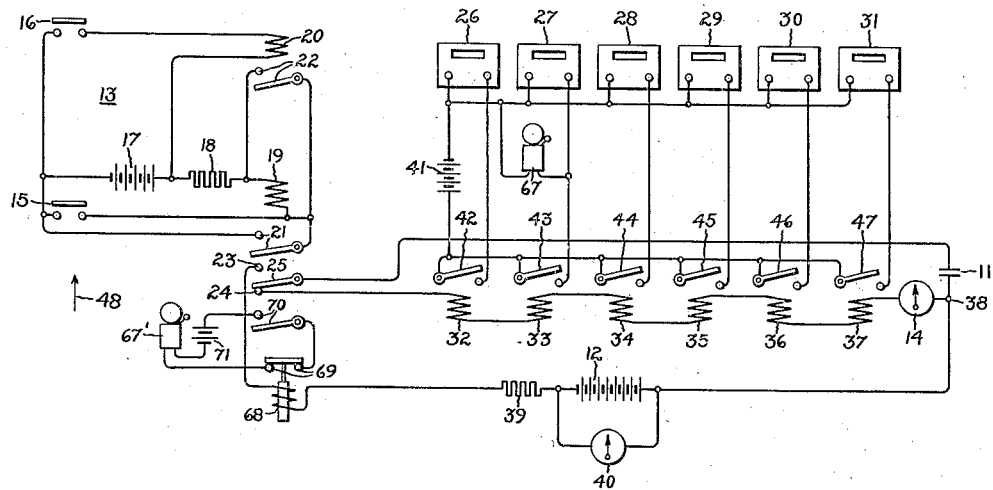
Figure 2:
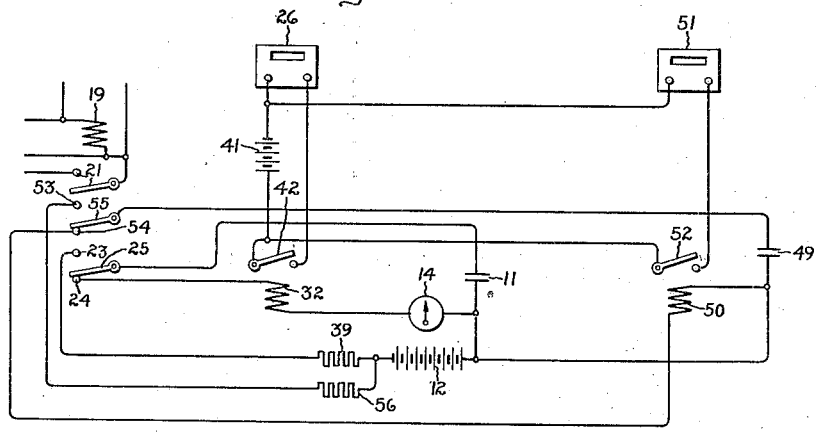
Figure 3:
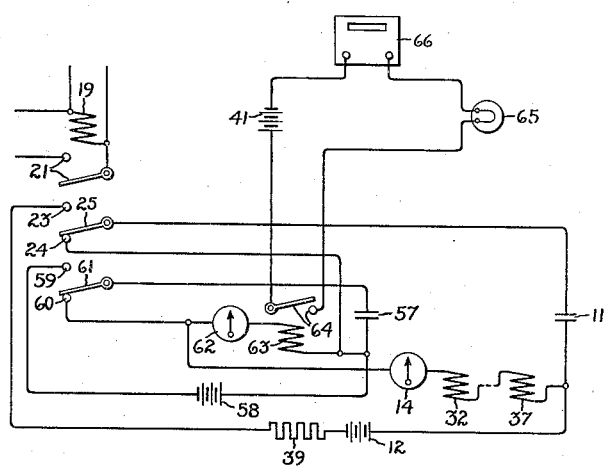
Figure 4:
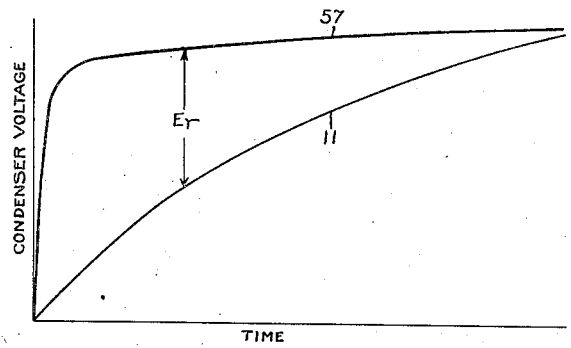
Figure 5:
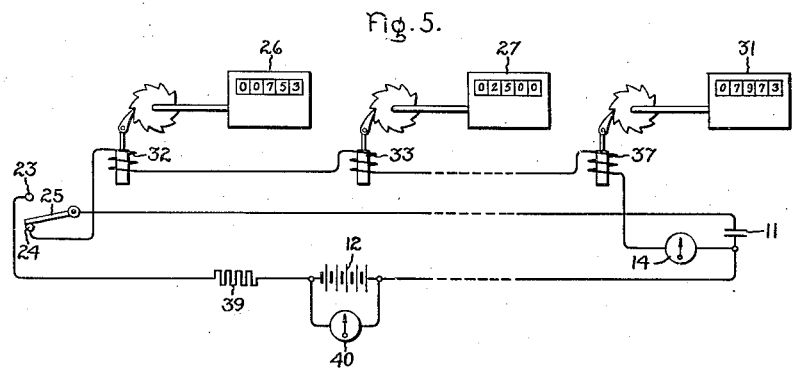
Figure 6:
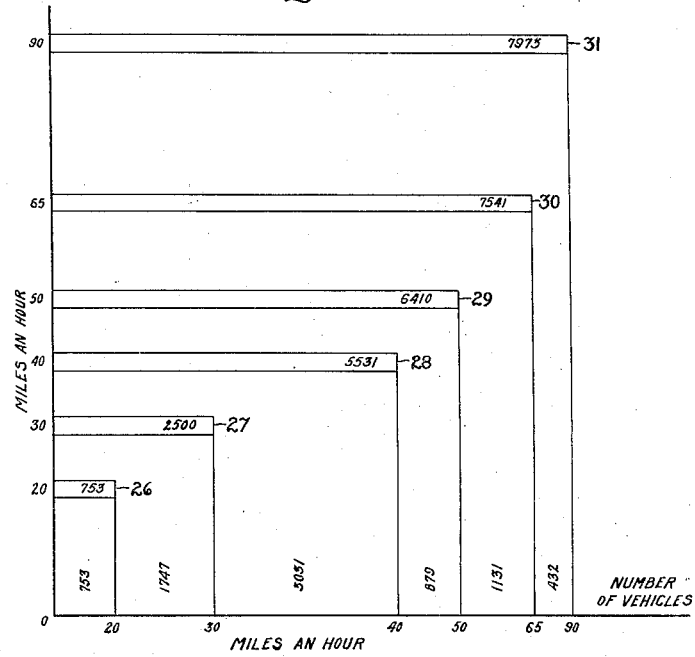

The features of my invention which are believed to be novel and patentable will be pointed out in the claims appended hereto. My invention may best be understood by referring to the following description taken in connection with the accompanying drawings in which Fig. 1 is a circuit diagram representing one embodiment of my invention; Fig. 2 is a circuit diagram representing in part another embodiment of my invention; Fig. 3 is a circuit diagram representing in part an embodiment including the feature of producing signals when vehicles pass at excessive speeds; Fig. 4 is a graph explaining the operation of the arrangement of Fig. 3; Fig. 5 is a circuit diagram representing in part a modification of the arrangement of Fig. 1; and Fig. 6 is a graph explaining the manner of obtaining readings from the arrangement of Fig. 1. Like reference characters are utilized in the drawing to designate like parts throughout.

In carrying out my invention according to the embodiment illustrated in Fig. 1, I provide a condenser 11, a source of current 12, and means 13 for causing the condenser to be connected to the current source 12 when a vehicle reaches a predetermined point in the roadway and for causing the condenser to be discharged when the vehicle reaches a more advanced predetermined point in the roadway. I also provide means, such as an ammeter 14, for determining the quantity of charge collected by the condenser 11. Since the time required for a vehicle to pass from one point to another is inversely proportional to its speed, the duration of the charging of the condenser 11 and, with the right circuit constants, the amount of charge collected by it will be a function of the speed of the vehicle.

My apparatus is well adapted to the analysis of traffic consisting of the ordinary road vehicles, primarily automobiles, and for the sake of illustration the invention will be described with reference to such traveling objects. It will be understood, however, that my invention is not limited thereto and that it may be used for counting moving objects of any character whatever, such as persons, runners in sport contests, airplanes, boats, projectiles, etc.

Any suitable means may be employed for causing the passage of the vehicle to effect the charging and discharging of the condenser 11. For example, I may provide a pair of circuit-closing devices at two points in the roadway which are operated in succession as the vehicle passes from one point to the next to initiate the charging and discharging of the condenser 11 through suitable relays. Each circuit-closing device may take any suitable form, such as a photo-electric tube amplifier and relay actuated upon the interruption of a light beam by the vehicle as it passes, or may simply take the form of a treadle, such as those represented schematically at 15 and 16 for closing electrical contacts as the vehicle passes over the points in the roadway where the treadles are placed. The treadle switches 15 and 16 are located a fixed and determinable distance apart, preferably greater than the length of the ordinary vehicle and less than the length of two ordinary vehicles. Obviously, if the treadle switches are too far apart, more than one vehicle traveling close together might come between the switches at one time and be counted as one. On the other hand, if the switches are too close together, the axles of each vehicle would be counted separately. This would not do any harm, however, and would merely call for utilizing counters advanced half as fast as in the case of an arrangement which did not count the two axles of a vehicle separately. The treadle switches 15 and 16 are so placed with respect to the direction of the vehicles that the treadle 15 is the one first operated.

A current source 17, a resistor 18, and a relay-actuating winding 19 are connected in series to the circuit closer 15 and a relay-actuating winding 20 is connected in series with the current source 17 to circuit closer 16. The relay-actuating winding 19 is provided with and controls a pair of normally open contacts 21 which are connected in parallel with the circuit closer 15 to maintain a holding circuit through the relay-actuating winding 19 after the vehicle has passed the circuit closer 15 and has permitted it to open. The relay winding 20 is provided with and controls a pair of normally open contacts 22 which are connected in parallel with the relay winding 19 for the purpose of short-circuiting the relay winding 19 and permitting its contacts to drop out when the vehicle has reached and operated the circuit closer 16. The relay 19 is provided with and controls also a pair of stationary contacts 23 and 24 and a movable contact 25 which are so arranged that contacts 24 and 25 are normally in engagement.

For the purpose of registering the number of vehicles passing on the roadway in addition to providing an indication of the speed of the vehicles as they pass, I also provide one or more counters 26 to 31, having actuating or controlling windings 32 to 37 connected in series with the indicating instrument 14. The counter-controlling windings may be arranged to operate the counting mechanisms of the counters 26 to 31 directly as illustrated in Fig. 5, or indirectly through control of an auxiliary current source 41. By the term "counter-controlling winding" in the specification and claims, I mean to include both windings actuating the counters directly as in Fig. 5, and those actuating the counters indirectly as in Fig. 1. In the arrangement illustrated in Fig. 1, contacts 42 to 47 controlled by windings 32 to 37 are provided for connecting the current source 41 to the counters 26 to 31, respectively. The current source 12 and the condenser 11 are connected in series between the stationary contact 23 and the movable contact 25. The counter-controlling windings 32 to 37 and the indicating instrument 14 are connected in series to the stationary contact 24 of the relay 19 and to the common terminal 38 of the condenser 11 and the current source 12. Preferably a resistor 39 is connected in series with the current source 12, having such a resistance with respect to the capacity of the condenser and voltage of source 12 as to fix the charging rate of the condenser 11 at a suitable value. The voltmeter 40 connected across the source 12 may also be employed for checking its voltage.

The counter-controlling windings 32 to 37 are so designed that each one will operate to close its contacts upon the passage of a different minimum current.

The operation of the apparatus is as follows:

When the vehicle, traveling in the direction of the arrow 48, crosses the circuit closer 15, the relay winding 19 is energized, a holding circuit is completed through the contact 21, and the movable contact 25 is moved against the stationary contact 23. The condenser 11 is thereby connected to the current source 12 and begins to receive a charge. When the vehicle crosses the circuit closer 16, the relay winding 20 is actuated, closing the contact 22 so as to deenergize the relay 19 and permit its contacts to drop out, bringing the movable contact 25 against the stationary contact 24. This operation disconnects the condenser 11 from the source 12 and closes a discharging circuit through the instrument 14 and the counter-controlling windings 32 to 37. The instrument 14 indicates the discharge current or current impulse which depends upon the charge collected by the condenser 11, depending in turn upon the time interval between the operating of circuit closers 15 and 16 by the vehicle. The instrument 14 may, therefore, be calibrated in terms of the average speed of the vehicle in its passage from the circuit closer 15 to the circuit closer 16.

The passage of the vehicle also causes current to flow through the windings 32 to 37 and, if the current or the current impulse is of sufficient value, each of the counters 26 to 31 is actuated so as to register the passage of the vehicle. If the speed of the vehicle was so great that sufficient charge could be collected to operate only the counter having most sensitive winding and mechanism to operate it, then, of course, only that one counter will register the passage of the vehicle. In a similar manner, at intermediate speeds a greater or less number of counters will register the passage of the vehicle, depending on its speed. In this way, each counter registers the total number of vehicles which have passed at or below a predetermined speed, each counter being adjusted for a different predetermined vehicle speed limit. For example, let it be assumed that the counter 26 or its controlling winding is adjusted to respond to all vehicles traveling at a speed of twenty miles per hour or less, counter 27 is adjusted for vehicles under thirty miles per hour, counter 28 for vehicles under forty miles per hour, counter 29 for vehicles under fifty miles per hour, counter 30 for vehicles under sixty-five miles per hour, and counter 31 for vehicles under ninety miles per hour. Then let it be further assumed that the registers of the counters 26 to 31, inclusive, have reached the readings indicated in Fig. 6 of 753, 2500, 5531, 6410, 7541, and 7973, respectively. The reading of each register indicates the number of vehicles which has passed since the register was set to zero at a speed less than that for which the counter is adjusted. By determining the difference between the readings of any two registers one may determine the number of vehicles which has passed at speeds within the corresponding speed range. For example, for the arbitrary values assumed, the register readings indicate that 432 vehicles have passed at speeds between sixty-five and ninety miles per hour, 1131 at speeds between fifty and sixty-five miles per hour, 879 at speeds between forty and fifty miles per hour, 3031 at speeds between thirty and forty miles per hour, 1741 at speeds between twenty and thirty miles per hour, and 753 at speeds under twenty miles per hour.

While in Fig. 1 I have shown an arrangement in which the counter-controlling windings are connected in series, it will be understood that my invention is not limited to such connection but obviously includes also the use of parallel connected windings, and separate condensers and resistors for each counter actuating winding if desired.

If desired, the apparatus may be arranged to give an alarm, operate a warning light, or produce some other signal whenever a vehicle passes at a speed exceeding a predetermined value. Such an arrangement is illustrated in part in Fig. 3. Preferably, for this purpose, an additional condenser 57 is provided. In order to charge the condenser 57, a separate current source 58 is also provided. The charging and discharging of the condenser 57 are controlled by a pair of stationary contacts 59 and 60 and a movable contact 61 operated by the relay winding 19 in a manner similar to the contacts 23, 24, and 25, which control the charging and discharging of the condenser 11.

One or more suitable current-responsive devices are connected in the discharge circuits of both condensers 57 and 11 in such a manner that the discharges of the two condensers pass in the opposite directions through the current-responsive devices. For example, I may employ an indicating instrument such as an ammeter 62 and a relay 63 connected in series with the discharge circuit of the condenser 11 and also forming a part of the discharge circuit of the condenser 57. The ammeter 62 will attain a predetermined deflection only when a vehicle passes at an excessive speed. The relay 63 may be provided with contacts 64 and a suitable device, such as a warning light 65, may be connected in series with the auxiliary source 41 and the contacts 64. If desired, I may also connect a counter 66 in series with a source 41 and the contacts 64 for the purpose of registering the number of vehicles passing at excessive speed.

The relay 63 is of such character that it responds only when the current therein exceeds a predetermined value. The indicator 62 and the relay 63 respond to passage of vehicles traveling at speeds in excess of a predetermined value instead of below a predetermined value, which will become apparent from a consideration of Fig. 4. Fig. 4 is a graph including a curve 57 representing the variation in the voltage of the condenser 57 with time as the condenser 57 is being charged from the source 58 and a curve 11 representing the variation in the voltage of the condenser 11 with time as the condenser 11 is being charged from the source 12. It will be observed that I have not shown any resistor in series with the source 58 for charging the condenser 57. In practice, I may either actually omit the resistor or utilize a resistor of smaller value, relative to the other elements of the circuit, than the resistor 39 so that the charging circuit of the condenser 57 has a considerably shorter time constant than that of the condenser 11. This is apparent from Fig. 4 in which the curve 57 rises much more rapidly than the curve 11 before it begins to taper off and approach the horizontal.

The difference in voltage between the condensers 57 and 11 in any instant while both condensers are being charged through their respective current sources is indicated by the difference in the ordinates of the curves 57 and 11. It will be seen that this difference, $E_r$, which is the resultant voltages acting upon the current-responsive devices 62 and 63 progressively decreases as the charging time increases. Therefore, when vehicles pass at low speeds and permit the condensers to be charged through relatively long periods, the resultant voltage $E_r$, will be relatively small, whereas in the cases of vehicles passing at high speeds, within the range of the apparatus, the resultant voltage, $E_r$, will be relatively great. Accordingly, by suitable calibration of the devices 62 and 63, a response may be obtained only whenever a vehicle passes at an excessive speed.

If desired, an alarm may be operated whenever a vehicle travels at a speed too low for proper movement of traffic. For example, as shown in Fig. 1, a warning bell 67 or other suitable device may be connected in shunt with the counting register 27, which was arbitrarily assumed to count vehicles traveling at thirty miles an hour or less. Accordingly, the warning bell 67 will be rung whenever a passing vehicle holds up traffic by traveling at a speed less than thirty miles an hour.

A low-speed alarm may also be arranged to operate independently of any of the counter-controlling windings. For this purpose, I may provide an undercurrent relay having a winding 68 connected in series with the battery 12 in the charging circuit of the condenser 11 and having a pair of contacts 69 which are normally closed but open when current of sufficient value flows through the winding 68. The relay-actuating winding 19 is provided with an additional pair of normally open contacts 70 and an auxilliary source of current 71 is also provided. A warning bell 67', or other suitable type of alarm, is connected in series with the current source 71 and the contacts 69 and 70.

When no vehicles are passing, the contacts 70 will be open and no current, of course, will flow through the warning bell 67'. However, when the circuit closer 15 is operated by the passage of a vehicle and the relay winding 19 is actuated, the contacts 70 will close and simultaneously the contacts 23 and 25 will close, causing the condenser charging current to flow through the winding 68 of the undercurrent relay. In consequence, the contacts 69 will open, preventing the flow of current through the warning bell 67'. However, if the vehicle passes at an undesirably low rate of speed, the charging of the condenser 11 will continue for such a length of time that the voltage of the condenser 11 approaches that of the battery 12 and the charging current will fall below a predetermined value, depending upon the constants of the circuit. The undercurrent relay 68 is so designed that, when a vehicle travels at a speed which is below a predetermined value, the value to which the current in the winding 68 falls will be insufficient to maintain the contacts 69 in the open position. According, the contacts 69 will close and cause the warning bell 67' to be energized. When a vehicle reaches the circuit closer 16 and deenergizes the relay winding 19, the contacts 70 will reopen and the underspeed warning circuit will be restored to its original position.

In the arrangement of Fig. 1, the registers 26 to 31 are made to correspond to different top speeds by employing register-actuating windings 32 to 37 having different sensitivities. The range of speed limits represented by the different counters may be increased by varying also the characteristics of other elements of the circuit, causing variations in the length of the condenser-charging period required to cause the actuation of a register. For example, in the arrangement of Fig. 2, I employ a plurality of condenser circuits, each of which may include one or more register-controlling windings as illustrated in Fig. 1. For the sake of clearness, I have shown only one register corresponding to each condenser.

In addition to the condenser 11, I provide one or more condensers, such as the condenser 49. Associated with the condenser 49, I provided a counting register-controlling winding 50, a relay contact 52, and a register 51 similar to the corresponding apparatus illustrated in Fig. 1. The apparatus 13 for controlling the charging and discharging of the condensers in response to the passage of vehicles may be similar to that shown in Fig. 1 except that I provide the relay-actuating winding 19 with additional stationary contacts 53 and 54 and an additional movable contact 55 similar to the contacts 23, 24 and 25, respectively. The contacts 53 and 55 control the charging of the condenser 49 from a source 12 through a resistor 56 and the contacts 54 and 55 control the discharging of the condenser 49 through the counter-actuating winding 50.

The counter 51 may be made to differ from the counter 26 in the length of the charging time required to produce an impulse of sufficient strength to operate it and, consequently, in the speed limit of the vehicles which will be counted by it by changing the constants of several elements in the circuit. As in the arrangement of Fig. 1, the relay-actuating winding 50 or the relay control spring may be so designed as to operate with a current impulse of a different strength than the winding 32. The capacity of the condenser 49 may be made different from that of the condenser 11 in order to cause a different amount of charge to be collected by the condenser 49 or the resistance of the resistor 56 may be made different from that of the resistor 39 in order to change the time required for a predetermined charge to be collected by the condenser 49.

While I have specifically mentioned definite circuit elements, the constants of which may be varied in order to vary the speed limits to which the register will respond, it will be understood that the resistance, capacity, inductance or other suitable properties of any desired circuit elements may be varied in order to produce the variation in characteristics of the counters.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A device for analyzing vehicle traffic according to traveling speeds, said device comprising in combination, a two-position relay biased to a normal position having normally closed and normally open contacts, means for energizing said relay when a vehicle crosses a given point and means for deenergizing the relay when the vehicles crosses a second more advanced point, a condenser and a source of current connected in series to the normally open contacts of said relay, a plurality of counter-controlling windings responsive to different minimum current values corresponding to different predetermined vehicle speeds, said windings being connected in series with said condenser to the normally closed contacts of said relay, and a plurality of counting registers, one for each of said counter-controlling windings, a separate register being provided for counting the number of vehicles passing at speeds below each predetermined speed.

2. A device for analyzing vehicle traffic according to traveling speeds, said device comprising in combination, a condenser, a source of current, a plurality of counter-controlling windings, means for connecting said condenser to said source of current when a vehicle crosses a given point and both disconnecting said source of current and discharging said condenser through said counter controlling windings when the vehicle crosses the second more advanced point, and a plurality of counting registers, one for each of said counter-controlling windings, said counter-controlling windings being responsive to different minimum current values corresponding to different predetermined vehicle speeds, a separate register being provided for counting the number of vehicles passing at speeds below each predetermined speed.

3. A device for selectively counting moving objects according to speed comprising in combination, a plurality of condenser discharge circuits, each including a condenser, a counter-controlling winding, a double-throw circuit maker and breaker, and connecting conductors, counting registers cooperating with each of said controlling windings, means for supplying charging current to said condensers and conducting members, said current-supplying means, conducting members, and circuit-makers-and-breakers with said condensers forming charging circuits, means controlling said circuit-makers-and-breakers for opening said discharging circuits and closing said charging circuits whenever an object passes a given point, and means controlling said circuit-makers-and-breakers for opening said charging circuits and closing said discharging circuits whenever an object passes a second point, the elements of said condenser circuits having such electrical dimensions that a different charging time is required in each circuit to produce a current impulse of sufficient strength to operate the counting register corresponding thereto, whereby the registers count the objects passing at speeds below different predetermined values.

4. A device for separately counting objects traveling at speeds above and below a predetermined speed, said device comprising in combination, a condenser, a source of current, an upper limit counter-controlling winding responsive to a predetermined minimum current, a counting register operated thereby, a second condenser, a second source of current, a lower limit counter-controlling winding responsive to a predetermined minimum current, a second counting register operated thereby, means for connecting said condensers to their respective sources of current whenever an object crosses a given point and disconnecting said sources of current whenever the object crosses a second more advanced point, and means for simultaneously discharging the first of said condensers through said upper limit counter-controlling winding and discharging both of said condensers oppositely through said lower limit counter-controlling winding whenever the object crosses the second point.

5. A device for counting objects traveling above a predetermined speed on a roadway, said device comprising in combination, a condenser, a source of charging current therefor, a second condenser, a second source of charging current therefor, a counter-controlling winding responsive to a predetermined minimum current, a counting register operable thereby, means for connecting said condensers to said sources of current whenever an object crosses a given point and disconnecting said sources of current whenever the object crosses a second more advanced point, and means for discharging said condensers oppositely through said counter-controlling winding when the object has crossed the second point.

6. Apparatus responsive to the pasage of an object above a predetermined speed, said apparatus comprising in combination, a condenser, a source of charging current therefor, a second condenser, a second source of charging current therefor, a device responsive to a predetermined minimum current, means for connecting said condensers to said sources of current whenever an object crosses a given point and disconnecting said sources of current whenever the object crosses a second more advanced point, and means for discharging said condensers oppositely through said current-responsive device when the object has crossed the second point.

7. Apparatus separately responsive to the passage of objects traveling at speeds above and below a predetermined speed, said apparatus comprising in combination, a condenser, a source of current, an upper speed limit current-responsive device responsive to a predetermined minimum current, a second condenser, a second source of current, a lower speed limit current-responsive device responsive to a predetermined minimum current, means for connecting said condensers to their respective sources of current whenever an object crosses a given point, and means for disconnecting said sources of current and simultaneously discharging the first of said condensers through the upper speed limit current-responsive device and discharging both of said condensers oppositely through said lower speed limit current-responsive device whenever the object crosses a second more advanced point.

8. An analyzer for traffic units passing between two points at various speeds, said traffic analyzer comprising a condenser, a plurality of counting devices with controlling windings selectively responsive to different magnitudes of condenser discharge current for classifying the number of traffic units passing between said points according to their speeds and means responsive to the passage of a traffic unit between two given points for charging said condenser during such passage and thereafter discharging said condenser through said windings.

9. A traffic analyzer comprising condenser means, current-supply means for charging said condenser means, means for connecting said current-supply means to said condenser means during passage of a traffic unit between two given points, counting means including current-conducting controlling winding means selectively responsive only to current impulses having a magnitude lying on a given side of a predetermined limit, and means for discharging said condenser means through said countercontrolling winding means after passage of a traffic unit.

10. A traffic analyzer comprising a condenser, a source of current having a substantially constant voltage, a plurality of counting devices with controlling windings selectively responsive to different magnitudes of condenser discharge current for classifying traffic units according to their speeds, and means responsive to the passage of a traffic unit between two given points for connecting said condenser to said current source during the passage of the traffic unit between said points and discharging said condenser through said windings after the passage of the traffic unit.

FRANK J. MOLES.